United States Patent [19]

Schneller

[11] Patent Number: 4,578,915
[45] Date of Patent: Apr. 1, 1986

[54] EXTERIOR WALL

[75] Inventor: Joseph W. Schneller, Williamsville, N.Y.

[73] Assignee: National Gypsum Company, Dallas, Tex.

[21] Appl. No.: 588,643

[22] Filed: Mar. 12, 1984

[51] Int. Cl.⁴ .............................................. E04C 1/00
[52] U.S. Cl. .................................. 52/309.12; 52/259; 52/446; 52/454; 52/612
[58] Field of Search .................. 52/309.9, 309.12, 443, 52/344, 259, 454, 444, 612, 741, 405, 268, 269, 270, 446

[56] References Cited

U.S. PATENT DOCUMENTS

| 1,461,590 | 7/1923 | Walper | 52/344 |
|---|---|---|---|
| 1,857,534 | 5/1932 | Ellis | 52/344 |
| 3,188,773 | 6/1965 | Schneller et al. | 52/444 X |
| 3,295,278 | 1/1967 | Muhm | 52/612 X |
| 3,389,518 | 6/1968 | Horbach | 52/309 |
| 3,942,294 | 3/1976 | Savell, Jr. | 52/259 |
| 4,067,164 | 1/1978 | McMillan | 52/309.12 |
| 4,324,080 | 4/1982 | Mullins | 52/405 |
| 4,361,616 | 11/1982 | Bomers | 428/215 |

OTHER PUBLICATIONS

Gold Bond Mason's Supplies, sales brochure, National Gypsum Co., ©1965, p. 31.

Primary Examiner—Carl D. Friedman
Attorney, Agent, or Firm—Robert F. Hause

[57] ABSTRACT

A building exterior wall having an exterior surface of a concrete-stucco formed in place over panels which have a polystyrene bead board core and thin concrete facings reinforced with a fiberglass open-weave mesh.

10 Claims, 3 Drawing Figures

EXTERIOR WALL

This invention relates to a building exterior wall, and particularly to a rigid, laminated insulating board with an exterior stucco coating adhered thereover.

BACKGROUND OF THE INVENTION

The exterior walls of buildings have been constructed using a relatively high density rigid sheathing board affixed to the vertical studs, a low density plastic foam insulation board affixed to the outer face of the sheathing board, and an exterior stucco layer formed in place on the outer surface of the foam board.

SUMMARY OF THE INVENTION

The present invention provides an equivalent wall and, in several respects, a more advantageous wall, constructed using a single board layer and an exterior stucco layer formed in place on the outer surface of the single board layer. The single board layer consists of board which has a plastic foam core and thin rigid facings of fiber reinforced set hydraulic cement.

It is an object of the invention to provide an improved exterior building wall construction.

It is a further object to provide a more economical exterior building wall construction.

It is a still further object to provide an exterior building wall construction having a completely unified, highly weather-resistant, relatively lightweight, thin, but very effective structure.

BRIEF DESCRIPTION OF THE DRAWINGS

These and other objects and advantages of the invention will be more readily understood when considered in relation to the preferred embodiments, as set forth in the specification and shown in the drawings in which.

DESCRIPTION OF THE PREFERRED EMBODIMENTS

Figure 1:
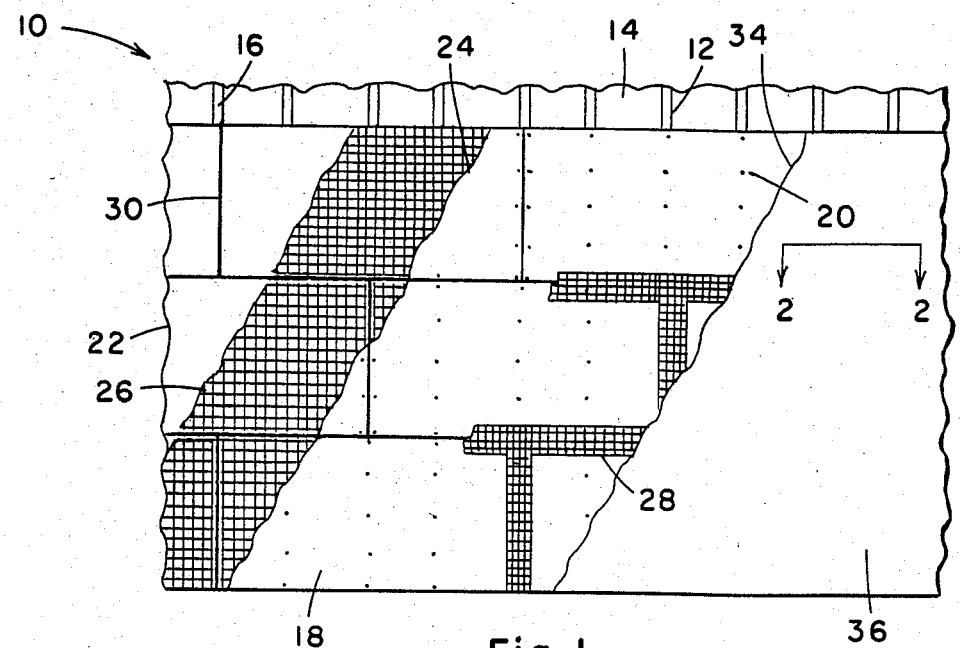
FIG. 1 is a front view of a wall in progressive degrees of completion, embodying the present invention.
Figure 2:
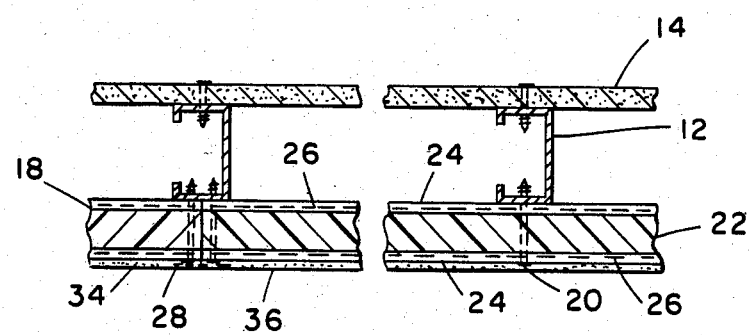
FIG. 2 is a cross-sectional plan view of the wall of FIG. 1 taken on line 2—2.
Figure 3:
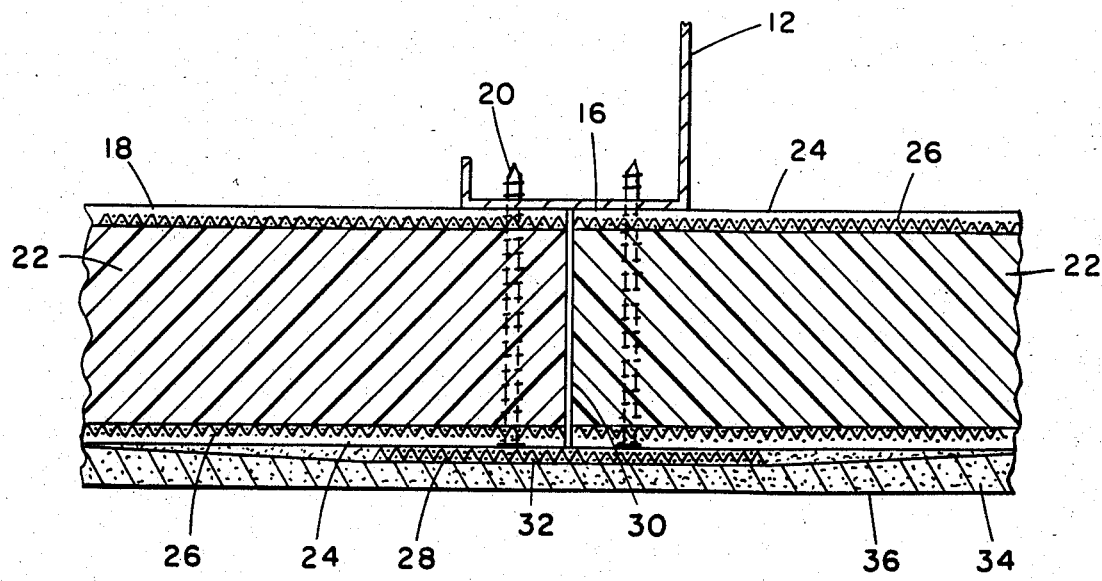
FIG. 3 is an enlarged portion of the cross-sectional plan view of FIG. 2.

Referring to FIG. 1 there is shown the outer side of a vertical exterior building wall 10 in various degrees of completion, the portion to the right being completed wall. The wall 10 includes a plurality of vertical steel studs 12 which have gypsum wallboard 14 affixed thereto on the inner surface.

On the outer surface 16, of each stud 12, there is affixed rigidized, laminated, concrete faced plastic foam panels 18. Each panel 18 is attached to the surfaces 16 of studs 12 by a plurality of screws 20. Each panel consists essentially of a 1"×4'×8' polystyrene bead board core 22, of about 1 to 3 lbs/cu. ft. density, to which has been laminated a portland cement facing 24 which contains within it a thin fiberglass mesh 26. The fiberglass mesh 26 is approximately 0.012 inch thick, with about six coated fiberglass strands per inch extending in each of the lateral direction and the longitudinal direction of the mesh 26. The portland cement facing 24 is about 0.016 inch thick, just sufficient to substantially conceal the mesh 26 disposed therewithin. The bead board core could, alternatively, be any thickness from about 178 " to 3".

On the exterior surface of the panels 18, narrow strips 28 of fiberglass mesh, similar to mesh 26, about two inches wide, are adhered over the joints 30 between adjacent panels 18. The mesh strips 28 are adhered over the joints 30 with a thin coat of portland cement taping composition 32, such as the composition used for forming the portland cement facing 24 on panels 18. The taping composition does not need to be any thicker than the 0.012 inch thickness of the mesh strips 28.

As soon as the taping composition 32 has taken an initial set, the entire exterior surface of panels 18 is coated with a 1/32 inch thick portland cement exterior coating 34, similar to the composition used to forming the portland cement facing 24 on panels 18. Coating 34 could, alternatively, be applied in thicknesses up to about ¼", using a plurality of coating steps. The surface 36 of the exterior coating 34 will preferably have a slight texture, which will form the building exterior surface.

The portland cement composition used for the panel facing 24, the taping composition 32 and the exterior coating 34 is of a formula approximately as follows:

|  | Pounds |
| --- | --- |
| Pre-Mix: | |
| Sand | 72 |
| Acrylic Latex Emulsion (50% solids) | 15 |
| Thickener | 0.5 |
| Defoamer | 0.25 |
| Ammonia | 0.1 |
| Preservative | 0.02 |
| Water | 13 |
| Portland Cement | 100 |

The portland cement is a standard Type I portland cement, except that in the exterior coating 34, a white portland cement may be substituted for the standard Type I portland cement. The acrylic latex emulsion may be Rohm & Haas latex E-330 or Rhoplex AC-64.

Preferably, the ingredients are mixed a day or two in advance of use, with the exception of the portland cement. Just prior to use, the portland cement is combined with the premixed material at about a 1:1 ratio. As the portland cement is added to the pre-mix, or as the two are being thoroughly mixed, additional water may be needed to obtain a consistency suitable for whatever application technique is to be used with the thoroughly mixed material.

Various methods may be employed in applying the portland cement facing 24, the taping composition 32 and the portland cement exterior coating 34. In applying the portland cement facing 24 and the taping composition 32 care must be taken to avoid wrinkling or displacing the fiberglass mesh 26 or the fiberglass mesh strips 28, respectively.

The facing 24 can be applied by spray application or by a roller application, either being preferably followed by a light screeding to improve the bond of the facing 24 to the bead board core 22. The fiberglass mesh stips 28 can be held by hand for a moment as an initial area is coated with taping composition 32 on a 4" broad knife, followed by continued application of the taping composition 32 with the same 4" broad knife.

The exterior coating 34 can be applied by spraying, roller coating or troweling. A substantially uniform coating is obtained by measuring the material prepared so that about ½ lb/sq ft is applied uniformly over the entire exterior of the panels 18.

Having completed a detailed disclosure of the preferred embodiments of my invention so that those skilled in the art may practice the same, I contemplate that variations may be made without departing from the essence of the invention or the scope of the appended claims.

I claim:

1. An exterior wall comprising an exterior surface of a thin, continuous concrete-stucco formed in place over a base consisting essentially of laminated, concrete-faced, plastic-foam-core panels, said panels consisting essentially of a relatively thick plastic foam core with substantially identical thin, fabric reinforced concrete facings of about 1/64 inch thickness on each face of the panel, said panels being affixed relative to a building framework.

2. An exterior wall as defined in claim 1 wherein narrow strips of reinforcing open-weave mesh are adhered over the joints of said panels and under said concrete-stucco surface.

3. An exterior wall as defined in claim 1 wherein said panels consist essentially of a low density polystyrene bead board core, of about 1 to 3 lbs/cu. ft. density.

4. An exterior wall as defined in claim 1 wherein said concrete-stucco exterior surface is about 1/32 to ¼ inch thick and comprises portland cement, sand and a latex emulsion.

5. An exterior wall as defined in claim 1 wherein said panels have a concrete facing which comprises portland cement, sand and a latex emulsion.

6. An exterior wall as defined in claim 1 wherein said panels consist essentially of a low density polystyrene bead board core with concrete facings formed in place on said core comprising portland cement, sand and a latex emulsion with a fiberglass open-weave mesh embedded therewithin.

7. An exterior wall as defined in claim 8 wherein said concrete-stucco exterior surface is about 1/32 to ¼ inch thick and comprises portland cement, sand and a latex emulsion.

8. An exterior wall as defined in claim 9 wherein said polystyrene bead board core is about ½ inch to 3 inches thick, said concrete facings of said panel are about 0.016 inch thick and said fiberglass open-weave mesh is about 0.012 inch thick.

9. An exterior wall comprising an exterior surface of a thin, continuous concrete-stucco formed in place over a base consisting essentially of laminated concrete-faced, plastic-foam-core panels, said panels consisting essentially of a relatively thick plastic foam core with a thin, fabric-reinforced concrete facing of about 1/64 inch thickness on at least one face of said panel, said formed-in-place stucco exterior surface being adhered to said thin, fabric-reinforced concrete facing on one face of said panel, said panels being affixed relative to a building framework.

10. An exterior wall as defined in claim 9 wherein said concrete-stucco exterior surface is about 1/32 to ¼ inch thick and comprises portland cement, sand and a latex emulsion.

* * * * *

UNITED STATES PATENT AND TRADEMARK OFFICE
CERTIFICATE OF CORRECTION

PATENT NO. : 4,578,915
DATED : April 1, 1986
INVENTOR(S) : JOSEPH W. SCHNELLER

It is certified that error appears in the above-identified patent and that said Letters Patent are hereby corrected as shown below:

Column 1, line 67: change "178" to ---1/2---.

Column 2, line 13: change "used to" to ---used for---.

Column 2, line 26: change "Pre-Mix" to ---Pre-Mix---.

Column 2, lines 26 and 34: Both "Pre-Mix" and "Portland Cement" should be brought closer to the left margin, lined up under each other, so that eight items between these two items are indented.

Column 2, line 61: change "stips" to ---strips---.

Column 4, line 10: change "claim 8" to ---claim 6---.

Column 4, line 14: change "claim 9" to ---claim 7---.

Signed and Sealed this

Twenty-second Day of July 1986

[SEAL]

Attest:

DONALD J. QUIGG

Attesting Officer           Commissioner of Patents and Trademarks